United States Patent [19]
Eike et al.

[11] Patent Number: 5,531,264
[45] Date of Patent: Jul. 2, 1996

[54] CONTROL APPARATUS FOR A COOLING UNIT WITH A HEATING FUNCTION AND A MULTI-COMPARTMENT TEMPERATURE MANAGEMENT APPARATUS FOR A VEHICLE USING THIS COOLING UNIT

[75] Inventors: Masatoyo Eike; Kunio Miyazaki, both of Konan, Japan

[73] Assignee: Zexel Corporation, Tokyo, Japan

[21] Appl. No.: 325,068

[22] Filed: Oct. 19, 1994

[51] Int. Cl.[6] .................................................. B60H 01/00
[52] U.S. Cl. ............................ 165/43; 165/42; 236/91 F; 237/12.3 B
[58] Field of Search ...................... 165/42, 43; 236/91 F, 236/91 G; 237/12.3 B

[56] References Cited

U.S. PATENT DOCUMENTS

| | | | |
|---|---|---|---|
| 4,483,151 | 11/1984 | Fujioka et al. | 165/43 |
| 4,949,779 | 8/1990 | Kenny et al. | 236/91 F |
| 5,085,269 | 2/1992 | Aoki | 165/43 |
| 5,291,941 | 3/1994 | Enomoto et al. | 237/12.3 B |
| 5,318,100 | 6/1994 | Aoki | 237/12.3 B |
| 5,367,601 | 11/1994 | Hannabery | 236/91 F |

*Primary Examiner*—Edward K. Look
*Assistant Examiner*—Mark Sgantzos
*Attorney, Agent, or Firm*—Wenderoth, Lind & Ponack

[57] ABSTRACT

An evaporator and heater core are provided within a cooling unit so that the flow rate of the heating medium flowing into the heater core can be adjusted with a 3-way valve. The target outlet temperature of the air discharged into the space being temperature controlled is calculated based upon the temperature of the air taken into the cooling unit and the temperature setting that is set at the temperature setting device. The openness of the 3-way valve is adjusted in such a manner that the temperature of the air outlet from the cooling unit is adjusted toward the target outlet temperature when the intake air temperature has entered a specific temperature setting range. Also, for each storage compartment, unit fans, an evaporator and a heater core are provided, housed within a unit case. The evaporators are connected in parallel to a common compressor to adjust the flow rates of the coolant with a solenoid valve. The heater cores are connected in series so that they share a common heat source and a bypass passage is provided that bypasses the heater cores to adjust the flow-rate ratios between the individual heater cores and the bypass passage with a 3-way valve.

9 Claims, 13 Drawing Sheets

CONTROL APPARATUS FOR A COOLING UNIT WITH A HEATING FUNCTION AND A MULTI-COMPARTMENT TEMPERATURE MANAGEMENT APPARATUS FOR A VEHICLE USING THIS COOLING UNIT

BACKGROUND OF THE INVENTION

1. Field of the Invention

The present invention relates to a temperature adjustment control apparatus that is used in a freezer car or the like that transports cargo in a specific temperature control state and in particular, a control apparatus for a cooling unit with a heating function, in which the cooling unit is provided with an integrated heating function and a multi-compartment temperature management apparatus that employs this cooling unit each of a plurality of storage compartments in a vehicle with a plurality of storage compartments, to perform individual temperature management for these storage compartments.

2. Description of the Related Art

An example of a vehicle that transports cargo in the known art is disclosed in Japanese Unexamined Patent Publication S58-145517. In this vehicle, a cooling unit is formed with a heat exchanger for cooling as part of the cooling circuit, and a fan that impels the air that has been heat exchanged in the heat exchanger for cooling to the space being air conditioned and, separately from this cooling unit, a heating unit is formed with a heat exchanger for heating which uses the engine cooling water as its heat source and a fan that impels the air that has been heat exchanged in the heat exchanger for heating to the space being air conditioned. The two units are located in the storage compartment.

However, in the structure described above, since the cooling unit and the heating unit are provided separately, a great deal of space is required. Also, switching between cooling and heating must be accomplished manually, with ON/OFF control of an electromagnetic valve. Consequently, when maintaining cargo at a constant temperature in changeable weather, the operation depends upon switching control at the discretion of the operator. Thus, there is a problem that temperature control at a constant temperature cannot be performed reliably.

Moreover, the structure in the prior art was designed on the premise that there is only one storage compartment in a vehicle. This presents no problem as long as only one type of cargo is being transported in large quantities. However, if there is only one storage space, as in the prior art, and if a number of different types of cargo, especially items for which different temperature control is required, are to be transported in small quantities, each cargo must be transported separately in small quantities and thus, transportation becomes extremely inefficient.

SUMMARY OF THE INVENTION

An object of the present invention is to provide a control apparatus for a cooling unit with a heating function that can realize constant temperature control regardless of the season by incorporating a heating function in the cooling unit in order to perform cooling and heating control automatically.

Another object of the present invention is to provide a multi-compartment temperature management apparatus for a vehicle that can meet the requirements of efficiently transporting different types of cargos in small quantities.

Therefore, the control apparatus for a cooling unit with a heating function according to the present invention includes unit fans, an evaporator that constitutes part of the cooling circuit and a heater core that constitutes part of the heating circuit, all three of which are provided within the unit case. It also includes a valve that changes the flow rate of the heating medium that flows into the heater core, an intake temperature sensor that detects the temperature of the air taken into the cooling unit, an outlet temperature sensor that detects the temperature of the air discharged from the unit case and a temperature setting device that sets the temperature in the space that is being air conditioned. The control apparatus is further provided with, at least, a means for target outlet temperature calculation that calculates a target temperature for the air being discharged into the space being temperature controlled based upon the intake temperature detected by the intake temperature sensor and the temperature setting that is set by the temperature setting device, and a means for valve openness control that can fully open or fully close the valve, based upon the intake temperature detected by the intake temperature sensor and the temperature setting that is set at the temperature setting device, until the intake temperature falls within a specific temperature setting range, and that adjusts the openness of the valve in such a manner that the outlet temperature detected by the outlet temperature sensor will be adjusted toward the target temperature when the intake temperature has come within the specific temperature setting range.

Also, the multi-compartment temperature management apparatus for a vehicle according to the present invention is provided with a unit case that houses unit fans, an evaporator that constitutes part of the cooling circuit, and a heater core that constitutes part of the heating circuit for each of a plurality of storage compartments. The evaporators that are housed in the individual storage compartments are connected in parallel so that they will communicate with a common compressor to constitute the cooling circuit, and the heater cores that are provided in the individual storage compartments are connected in series so that they will share a common source of heat to constitute the heating circuit. The heating circuit is provided with passages that bypass the heater cores. The temperature management apparatus also includes first valves that change the flow rate of the coolant that flows into each evaporator and second valves that change the ratio of the flow-rate of the heating medium that flows into the heater cores to the heating medium that bypasses the heater cores.

For the first valves, solenoid valves that adjust the flow rate for each evaporator may be used and for the second valves, 3-way valves may be used that adjust the flow-rate ratio for each heater core.

Additionally, in this type of apparatus it is desirable to provide an intake temperature sensor that detects the temperature of the air taken into the unit case, an outlet temperature sensor that detects the temperature of the air discharged from the unit case, a temperature setting device that sets the temperature in the storage compartment, a means for target outlet temperature calculation that calculates a target temperature for the air being discharged into the storage compartment based upon the intake temperature detected by the intake temperature sensor and the temperature setting that has been set at the temperature setting device, a means for valve openness control that fully opens or fully closes the second valve based upon the intake temperature detected by the intake temperature sensor and the temperature setting that has been set at the temperature setting device until the intake temperature falls within a specific temperature setting range and that adjusts the openness of the second valve in such a manner that the outlet temperature detected by the outlet temperature sensor will be adjusted toward the target temperature when the intake temperature has come within the specific temperature setting range, for each storage compartment.

Consequently, in the control apparatus for a cooling unit with a heating function described above, the inflow of the heating medium into the heater core is controlled by either fully opening or fully closing the valve until the intake temperature falls within a specific temperature setting range so that the intake temperature approaches the temperature setting promptly. When the intake temperature has come within the specific temperature setting range, the openness of the valve is then adjusted in such a manner that the outlet temperature detected by the outlet temperature sensor will be adjusted toward the target outlet temperature calculated by the means for target outlet temperature calculation to control the quantity of heating medium flowing into the heater core. Since the outlet temperature, too, is adjusted toward the target temperature in the later stage when the intake temperature has reached the temperature setting, disparities in temperature distribution in the space being temperature controlled are minimized and the temperature in the space being temperature controlled can be maintained at a constant level.

Moreover, in the multi-compartment temperature management apparatus for a vehicle described above, the evaporators for the various storage compartments are provided in parallel in the cooling circuit system so that coolant can be supplied to them from a common compressor and the quantities of coolant supplied to the individual evaporators are adjusted by the first valves. Also, the heater cores for the individual storage compartments are provided in series in the heating circuit system so that heating medium can be supplied to them from a common heat source and the quantities of heating medium supplied to the individual heater cores are adjusted by the second valves. In this manner, the cooling and heating capacity for each storage compartment can be regulated arbitrarily by operating the first and second valves in various combinations, achieving independent temperature control for each storage compartment.

In a multi-compartment temperature management apparatus for a vehicle, the inflow of heating medium to the heater core is controlled by either fully opening or fully closing the valve until the intake temperature falls within a specific temperature setting range so that the intake temperature approaches the temperature setting promptly to accomplish temperature adjustment for each storage compartment. When the intake temperature has come within the specific temperature setting range, the openness of the valve is then adjusted in such a manner that the outlet temperature detected by the outlet temperature sensor will be adjusted toward the target outlet temperature calculated by the means for target outlet temperature calculation, to control the quantity of inflow to the heater core. Since the outlet temperature, too, is adjusted toward the target temperature in the later stage, when the intake temperature has reached the temperature setting, disparities of temperature distribution in the space being temperature controlled are minimized and the temperature in the space being temperature controlled can be maintained at a constant level.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings:

FIG. 9($a$) shows the input/output signal structure of the control unit provided for each cooling unit and FIG. 9($b$) shows the input/output signal structure of the control unit provided for a preheater;

DETAILED DESCRIPTION OF THE PREFERRED EMBODIMENT

The following is an explanation of an embodiment according to the present invention in reference to the drawings.

Figure 1:
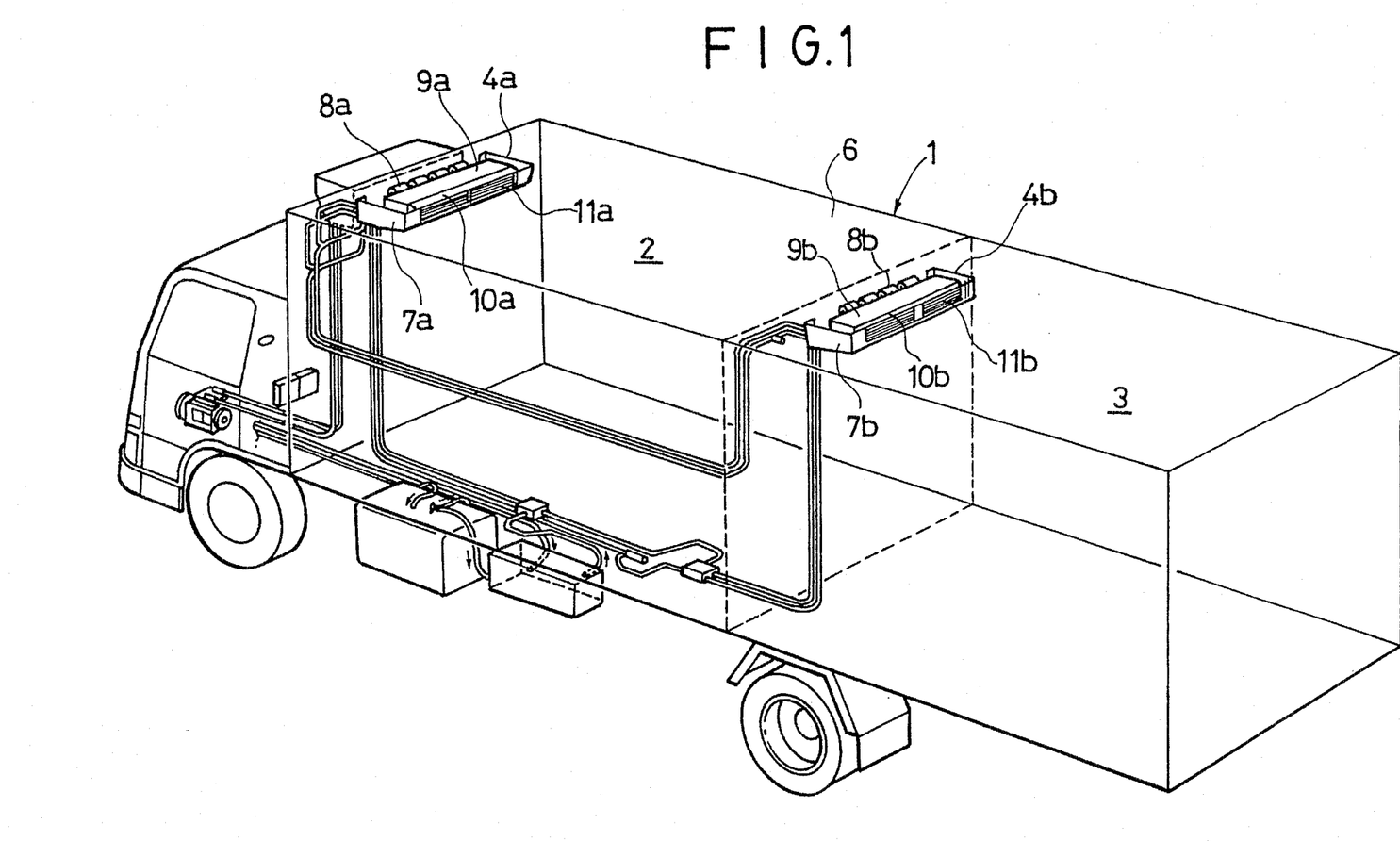
FIG. 1 is a perspective view of a vehicle provided with the multi-compartment temperature management apparatus according to the present invention.

In FIG. 1, the multi-compartment temperature management apparatus for a vehicle is structured by dividing the storage unit 1 into, for example, two compartments, i.e., a front storage compartment 2 and a rear storage compartment 3 and mounting a cooling unit with a heating function 4$a$ in the front storage compartment and a cooling unit with heating function 4$b$ in the rear storage compartment. Note that the structure in the front storage compartment and the structure in the rear storage compartment are identical in this embodiment, and that when referring to identical components of the front storage compartment and the rear storage compartment, "a" is added to the number to indicate a component in the front storage compartment and "b" is added to indicate a component in the rear storage compartment.

Figure 2:
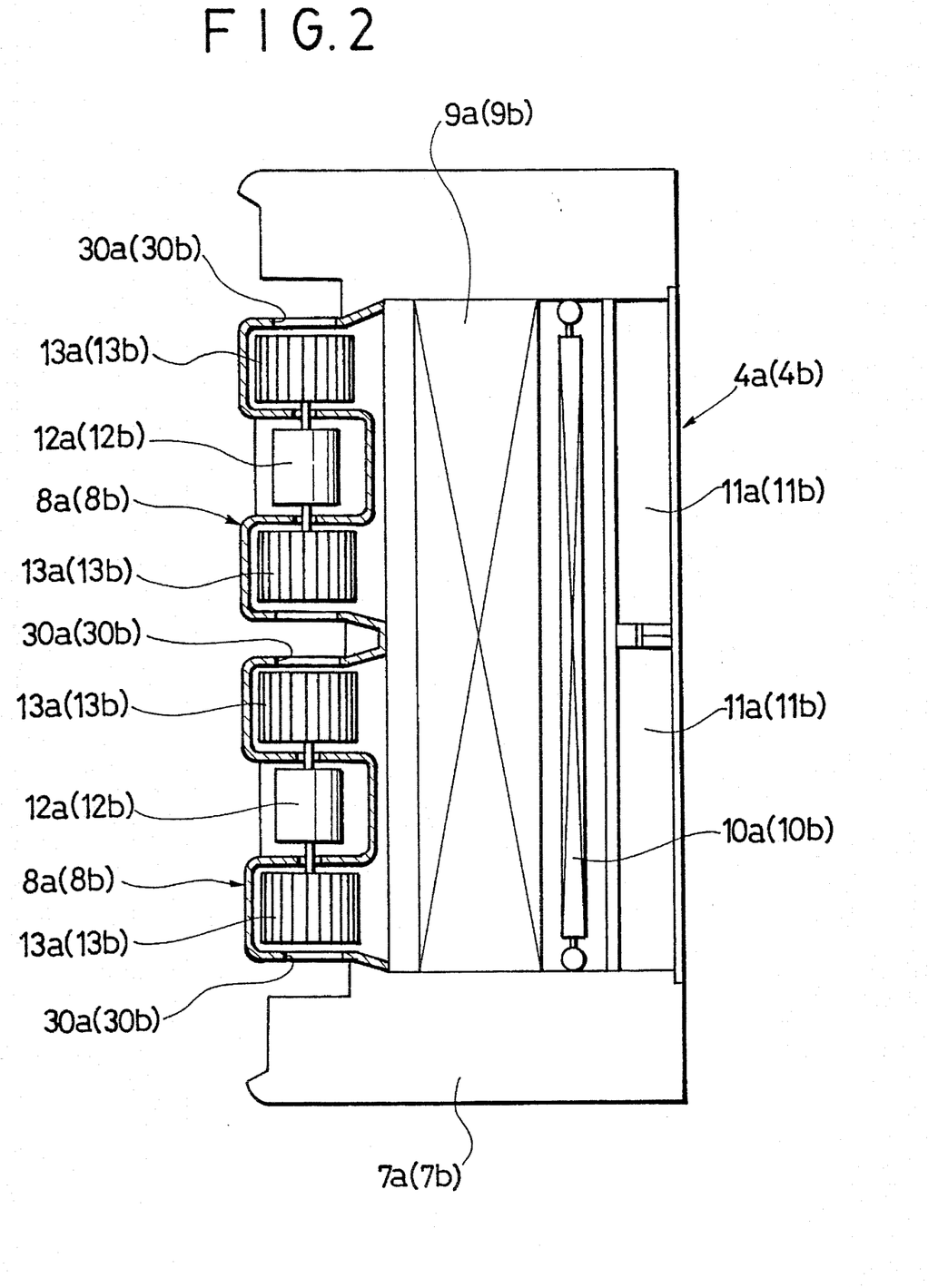
FIG. 2 is a plan view schematic cross section showing the structure of a cooling unit used in the multi-compartment temperature management apparatus according to the present invention.
Figure 3:
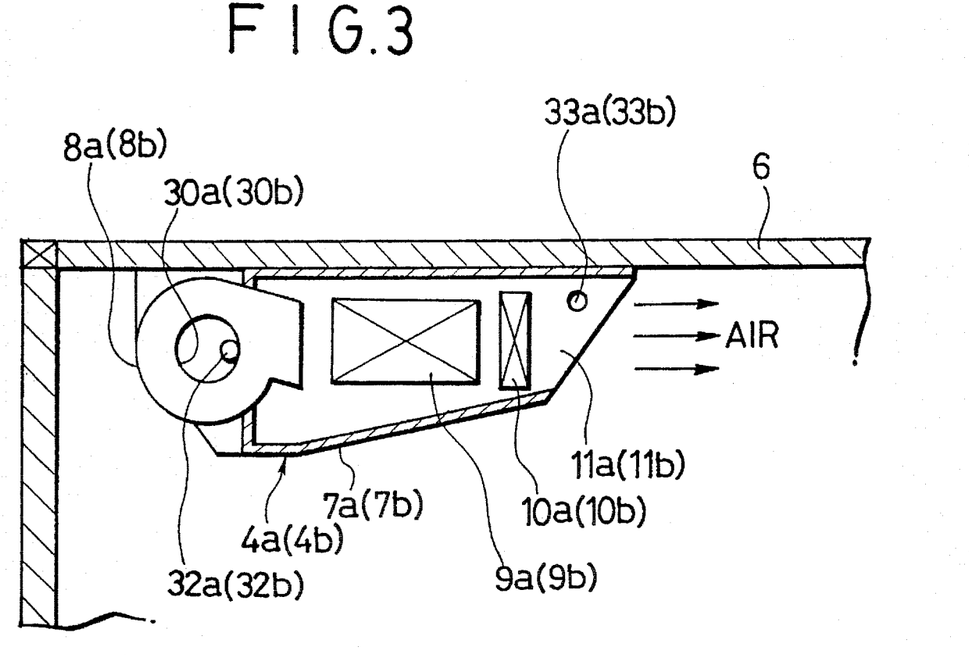
FIG. 3 is a side view schematic cross section showing the structure of the cooling unit shown in FIG. 2.

The cooling units 4a, 4b are secured on the ceiling 6 toward the front, for example, in the two storage compartments and, as shown in FIGS. 2 and 3, in each storage compartment, the unit fans 8a (8b) are provided at the extreme upstream side, the evaporator 9a (9b) is provided immediately downstream of the unit fans 8a (8b) and the heater core 10a (10b) is provided toward the rear of the evaporator 9a (9b) within the unit case 7a (7b). The air taken in through the unit fans 8a (8b) is temperature controlled by the evaporator 9a (9b) and the heater core 10a (10b) and is then impelled into the storage compartment via the outlet vent 11a (11b) which is provided at the extreme downstream side.

The unit fans 8a (8b) are twin fans, structured by connecting a pair of sirocco-type fans 13a (13b) to both ends of the drive shaft of the motor 12a (12b) and two unit fans 8a (8b) are positioned along the end surface at the air intake side of the evaporator 9a (9b) to which the air drawn air from inside each storage compartment with the rotation of the motors 12a (12b) is supplied.

Figure 5:
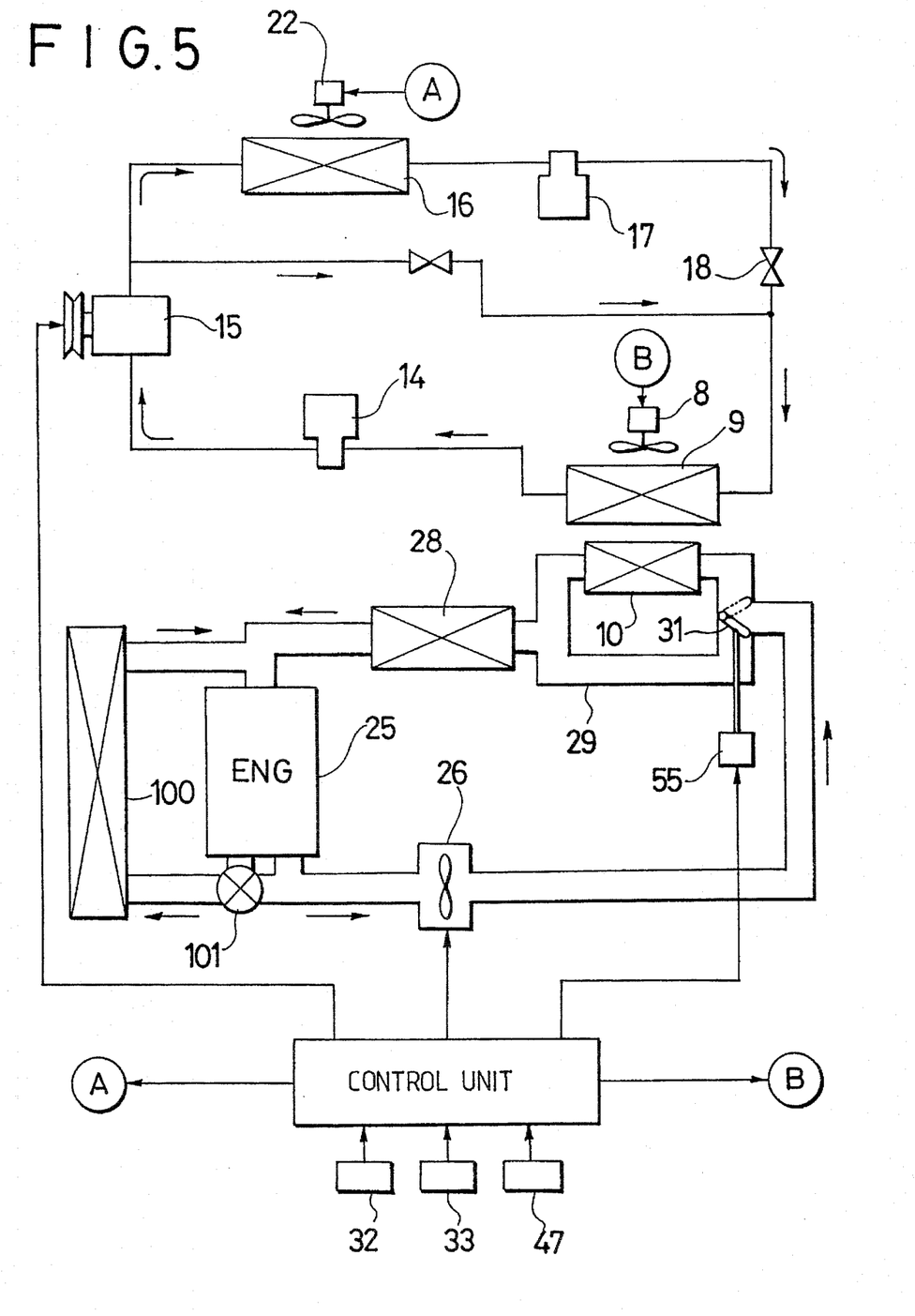
FIG. 5 shows an example of the piping structure for the cooling unit shown in FIG. 4.

To explain an example of the piping structure in a case in which an identical cooling unit is installed in a vehicle with only one storage compartment, as shown in FIG. 5; the evaporator 9 constitutes part of the cooling circuit by sequentially linking, via piping, the accumulator 14, the compressor 15, the condenser 16, the liquid tank 17 and the expansion valve 18. The condenser fan 22, which cools the condenser 16 is provided at a location where it faces opposite the condenser 16.

The heater core 10 fully reheats all the air that has passed through the evaporator 9 and uses the cooling water from the engine 25 as its heat source. The circulating paths of the engine cooling water include a first path that is constituted by sequentially linking with piping, the water pump 26, which drives the cooling water from the engine 25 under pressure, the heater core 10 within the cooling unit and the heater core 28 provided on the driver's cabin side, and a second path through which the engine cooling water is supplied to the radiator 100, where the water is cooled and returned to the engine 25. A switching valve 101, which opens the second path when the temperature of the cooling water exceeds a specific level, is provided in the second path. Additionally, a bypass passage 29 which bypasses the heater core 10 in the cooling unit is formed in the first path and a 3-way valve 31, which adjusts the ratio of the cooling water that flows toward the heater core to the cooling water that flows through the bypass passage, is provided at the branching point of the bypass passage 29.

Then, the detection signals from the intake air temperature sensor 32 that detects the temperature of the air taken into the cooling unit and the outlet air temperature sensor 33 that detects the temperature of the air discharged from the cooling unit, and a signal from the temperature setting device 47 that sets the temperature inside the compartment are input to the control unit where the signals are processed according to a specific program to control the ON/OFF of the compressor 15, the air delivery capacities of the condenser fan 22 and the unit fans 8, as well as the ON/OFF of the water pump 26 and the actuator 55 which operates the 3-way valve 31 via the drive circuit.

Figure 6:
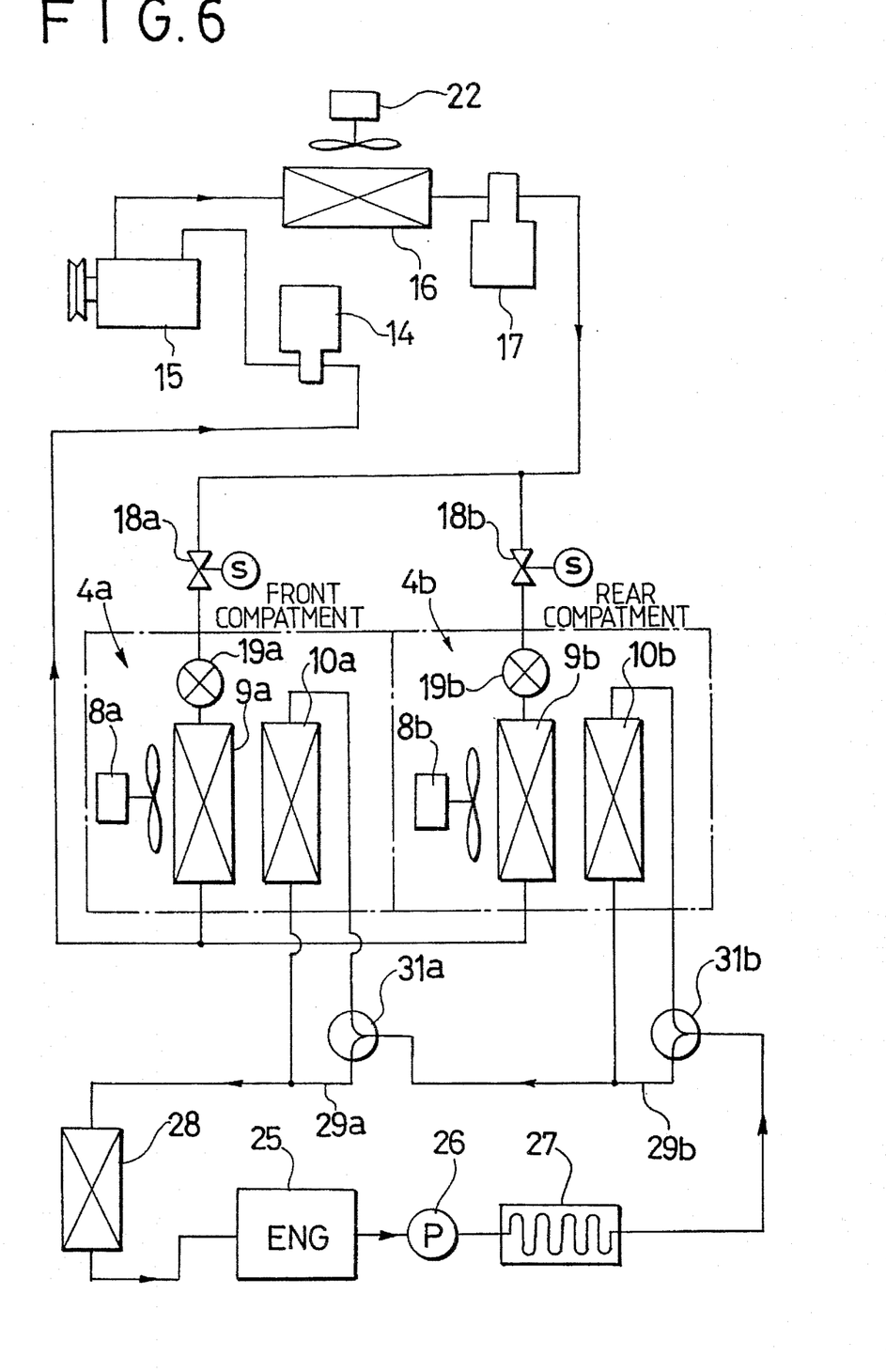
FIG. 6 shows an example of the piping structure for the case in which a cooling unit is provided in each storage compartment in a vehicle with two Storage compartments, front and rear.

The following is an explanation of an example of a structure in which this basic piping structure is modified to achieve temperature adjustment control for two storage compartments; a front compartment and a rear compartment. The evaporator 9a for the front storage compartment constitutes the cooling circuit for the front storage compartment by sequentially linking with piping, the accumulator 14, the compressor 15, the condenser 16, the liquid tank 17, the solenoid valve 18a and the expansion valve 19a, as shown in FIG. 6. The evaporator 9b for the rear storage compartment constitutes the cooling circuit for the rear storage compartment by being sequentially linked by piping with the solenoid valve 18b and the expansion valve 19b, while sharing the accumulator 14, the compressor 15, the condenser 16 and the liquid tank 17 mentioned earlier. As a result, the serial path that is constituted with the solenoid valve 18a, the expansion valve 19a, and the evaporator 9a, and the serial path that is constituted with the solenoid valve 18b, the expansion valve 19b, and the evaporator 9b, are connected in parallel relative to the path constituted with the accumulator 14, the compressor 15, the condenser 16 and the liquid tank 17, which they share.

Consequently, when air is supplied by the unit fans to the evaporator on the path where the solenoid valve is open with the compressor 15 operating, the air is cooled while passing through the evaporator. In other words, when the compressor 15 is operating (ON), the coolant discharged from the compressor 15 releases heat at the condenser 16 to become condensed liquid. Then, vapor is separated from liquid at the liquid tank 17 and it turns into low temperature, low pressure coolant at the expansion valves 19a, 19b on the paths where the solenoid valves 18a, 18b are open. Finally, at the evaporator 9a, 9b, the coolant absorbs heat from the air that is passing through the evaporator to become evaporated.

Note that the condenser fan 22, which cools the condenser 16, is provided at a point where it faces opposite the condenser 16.

The heater core 10a (10b) reheats all the air that has passed through the evaporator 9a (9b) and uses the cooling water from the engine 25 as its heat source. The circulating path of the engine cooling water is constituted by sequentially linking with piping, the water pump 26, which drives the cooling water from the engine 25 under pressure, the preheater 27, which heats the supplied cooling water, the heater core 10b provided inside the cooling unit for the rear storage compartment, the heater core 10a provided inside the cooling unit for the front storage compartment, and the heater core 28 provided in the driver's cabin. This circulating path is further provided with the bypass passages 29a, 29b that bypass the heater cores 10a, 10b respectively and the 3-way valves 31a, 31b, which adjust the ratios of the cooling water flowing toward the heater cores and the cooling water flowing through the bypass passages 29a, 29b are provided at the upstream side of the branching points of the bypass passages 29a, 29b respectively.

Figure 7:
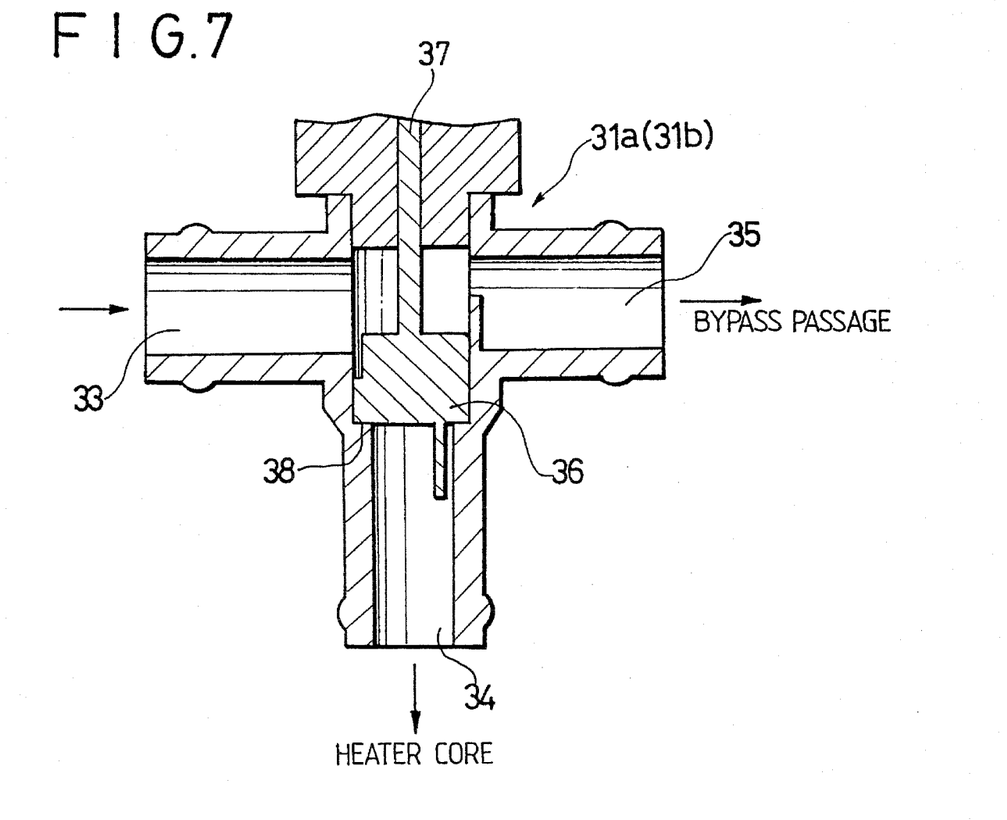
FIG. 7 is a cross section showing a 3-way valve used in the multi-compartment temperature management apparatus for a vehicle according to the present invention.

FIG. 7 shows an example of a structure for the 3-way valves 31a, 31b, each of which is provided with the inflow port 33, through which the in-coming cooling water flows, the outflow port 34 on the heater core side which is connected to a passage on the heater core side, and the outflow port 35 on the bypass side which is connected with either the bypass passage 29a or 29b. In each 3-way valve, the valve plug 36 is provided in the area where the heater core side outflow port 34 branches off from the bypass side outflow port 35. This valve plug 36 is connected to, for example, the rod 37 of the 3-way valve openness adjustment actuator in such a manner that it can move in the direction that the heater core side outflow port 34 leads. The valve plug is structured so that if it is located in contact with the valve seat portion 38, which is formed in the vicinity of the branching point of the heater core side outflow port 34, it can completely close off the outflow port, and if it is separated from the valve seat portion 38 as far as it goes, it can completely close off the bypass side outflow port 35 with the side surface of the valve plug 36. Consequently, the openness of the valve can be continuously adjusted from the degree of openness state at 0%, in which the heater core side outflow port 34 is entirely closed off and only the bypass side outflow port 35 is open, through the degree of openness state at 100%, in which the bypass side outflow port 34 is entirely closed off and only the heater core side outflow port 35 is open.

Also, as shown in FIG. 3, the intake temperature sensor 32a (32b), which detects the temperature of the air taken into the unit, is provided at the air intake ports 30a (30b) of the unit fans 8a (8b) and the outlet temperature detection sensor 33a (33b) that detects the temperature of the air discharged from the unit 4a (4b) is provided in the vicinity of the outlet port 11a (11b) of the cooling unit 4a (4b). Of the detection signals from these temperature sensors, signals that correspond to the front storage compartment are input to the front storage compartment control unit 35 and signals that correspond to the rear storage compartment are input to the rear storage compartment control unit 36 as shown in FIG. 9(a).

The control units 35, 36 are of the known art and each of them is provided with an input circuit that includes an A/D converter, a multiplexer or the like, a calculation processing circuit that includes a timer, a ROM, a RAM, a CPU or the like, and an output circuit that includes an I/O port or the like. In addition to the input signals from the intake temperature sensor 32a (32b) and the outlet temperature sensor 33a (33b), signals from the operating panel 40a (40b) that is used to operate the cooling unit in each storage compartment, are also input to the control unit 35 (36).

Figure 8:
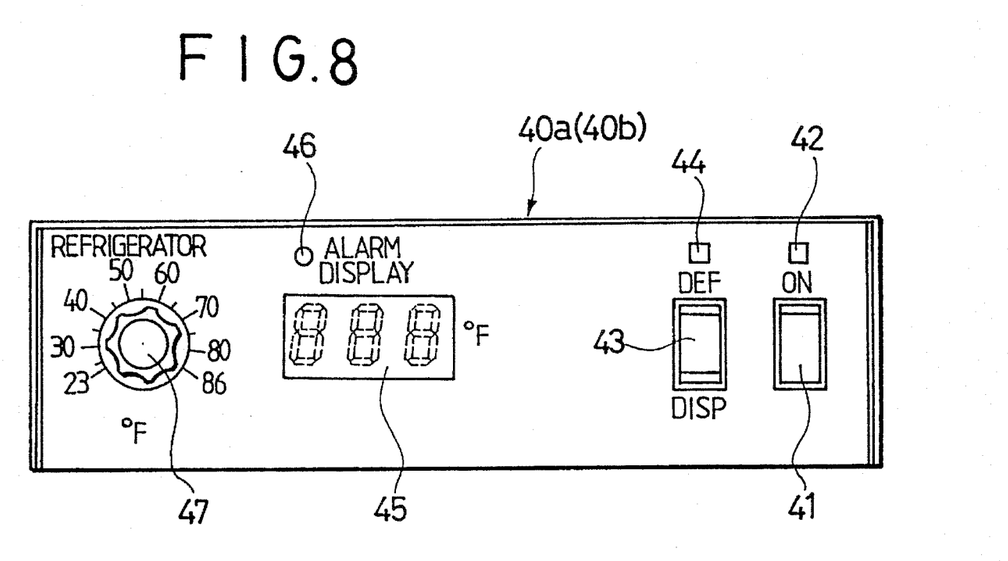
FIG. 8 a front view of the operating panel for operating the cooling unit in each storage compartment.

One operating panel 40a (40b), as shown in FIG. 8, is provided for each storage compartment and it is provided with an operation switch 41 for starting and stopping the cooling unit, an operation indicator LED 42 that is lit when the operation switch is ON, a momentary switch 43 that enables selective specification between the defrosting mode (DEF mode) and the display switch mode (DISP mode), the defrost LED 44 that is lit during the DEF mode, the 3-digit digital indicator unit 45, the ALM/DISP_LED 46 that is lit or flashes when an alarm is issued or when the display on the digital indicator unit is switched and the temperature setting device 47 that sets the temperature inside the compartment within the range of 23°–86° F. (–5°–30° C.).

Figure 9A:
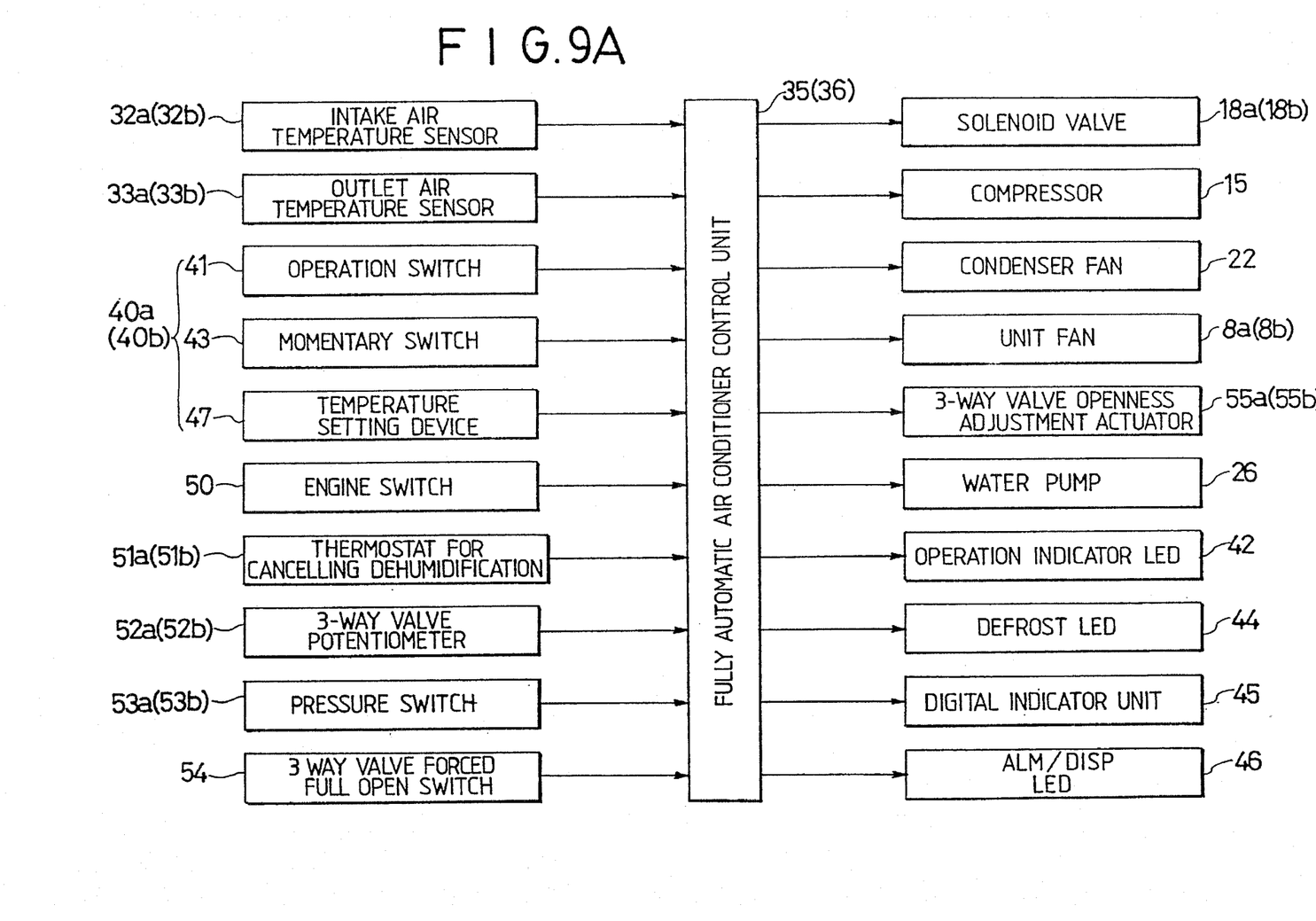

Additionally, as shown in FIG. 9(a), signals from the engine switch 50 that switches modes among the ON mode, which sets the engine in the operating state by operating the ignition key, the ACC mode, in which the engine itself is stopped but the peripheral devices remain under power from the battery, and the OFF mode, in which the battery power is also cut off, signals from the thermostat 51a (51b) for canceling the dehumidification operation, signals from the potentiometer 52a (52b) which detects the degree of openness of the 3-way valve, signals from the pressure switch 53a (53b) and signals from the switch 54 that forcibly opens the 3-way valves fully in the front storage compartment and the rear storage compartment at the same time are input to the control unit 35 (36) and these various signals are processed according to a specific program to control the OPEN/CLOSE (ON/OFF) of the solenoid valve 18a (18b), the ON/OFF of the compressor 15, the ON/OFF of the condenser fan 22, the air delivery capacity of the unit fans 8a (8b), the ON/OFF of the water pump 26 and the actuator 55a (55b) which operates the 3-way valve 31a (31b) via the drive circuit.

Figure 9B:
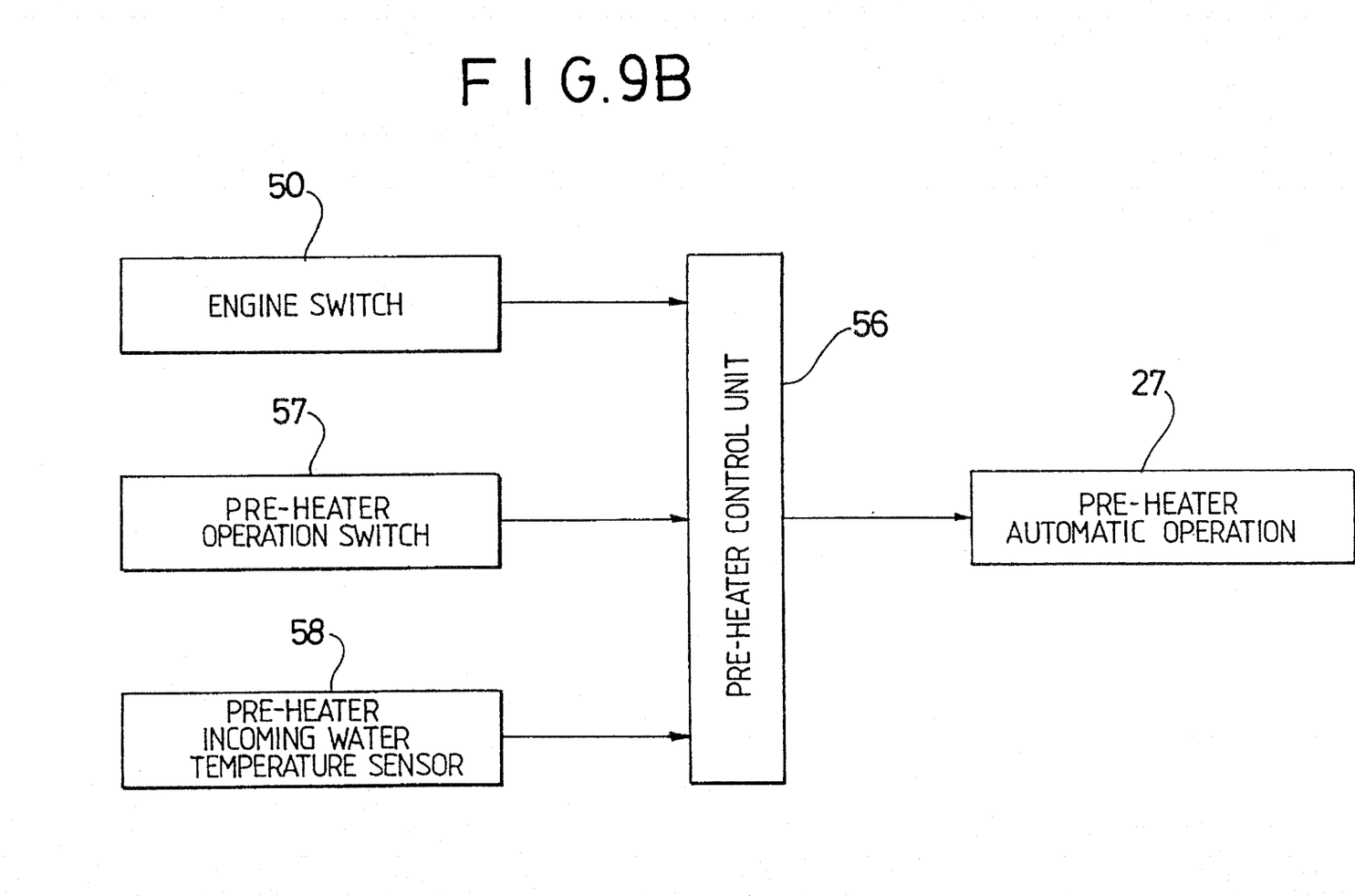

Moreover, the multi-compartment temperature management apparatus for a vehicle is provided with a control unit for the preheater 56 as well as the control units 35, 36 described above, as shown in FIG. 9(b). The ON mode signal or the ACC mode signal from the engine switch 50 is input to this control unit for the preheater 56 and, at the same time, signals from the preheater operation switch 57 and signals from the preheater intake port water temperature sensor 58 are also input. Then the control unit 56 processes these signals according to a specific program to automatically operate the preheater 27.

Figure 10:
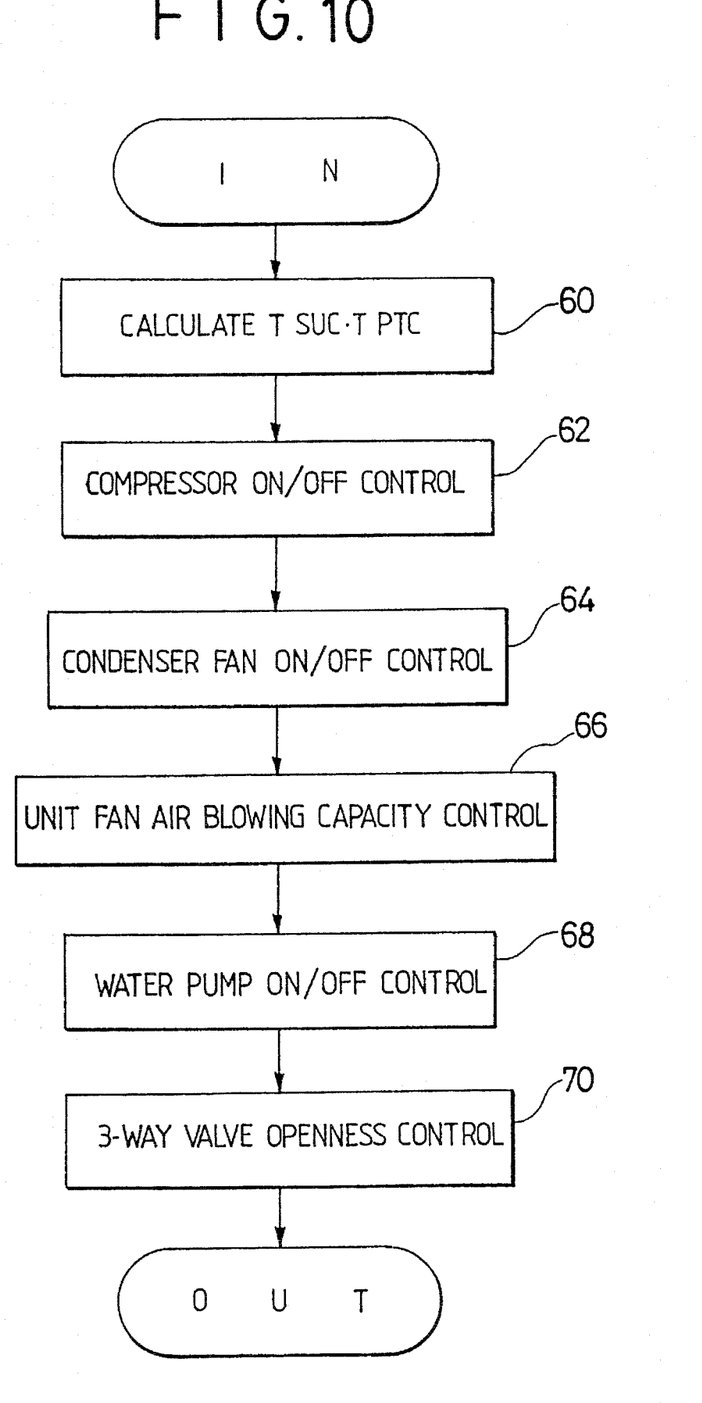
FIG. 10 is a flow chart showing an example of a control operation in which temperature adjustment control for one storage compartment is performed.

Since the control operations performed by the control units 35, 36 are identical, only the example of actual control operation for the front storage compartment is explained below. In the flow chart shown in FIG. 10, the control unit 35 calculates the difference ($\Delta T = T_{SUC} - T_{PTC}$) between the intake temperature ($T_{SUC}$) and the set temperature ($T_{PTC}$) under conditions in which the cooling unit 4 is operating in step 60. Next, based upon this difference, ON/OFF control is performed for the compressor 15 in step 62, ON/OFF control is performed for the condenser fan 22 in step 64, the air supply capacity of the unit fans 8a is controlled in step 66, ON/OFF control is performed for the water pump 26 in step 68 and in step 70, the degree of openness of the 3-way valve 32 is controlled.

Figure 11:
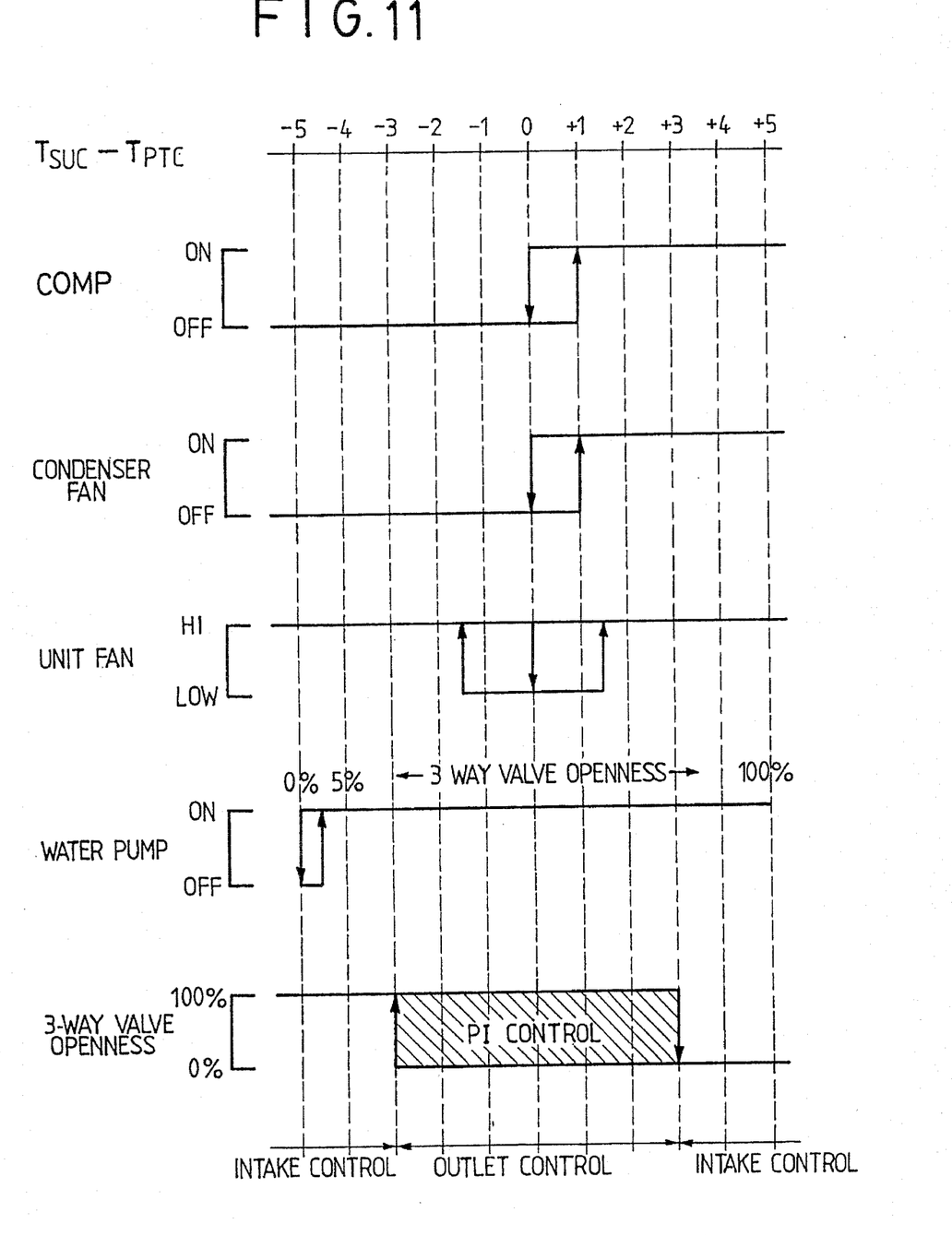
FIG. 11 is a characteristics diagram showing an example of the control operation for each of the component devices in the multi-compartment temperature management apparatus for a vehicle.

To be more specific, as shown in FIG. 11, the compressor 15 shifts from OFF to ON if the difference ($\Delta T = T_{SUC} - T_{PTC}$) between the intake temperature and the set temperature is, for example, +1° C. or more, and if the difference is 0° C. or a negative value, the compressor 15 shifts from ON to OFF. The condenser fan 22, shifts from OFF to ON if the difference ? T is, for example, +1° C. or more, and if it is 0° C. a negative value, the condenser fan 22 shifts from ON to OFF and the unit fans 8a shift from high speed rotation (HI) to low speed rotation (LOW), if $\Delta T = 0°$ C., for example, and if $\Delta T > 1.5°$ C., they shift from low speed rotation (LOW) to high speed rotation (HI). As for the water pump 26, it shifts from ON to OFF if the degree of openness of the 3-way valve is, for example, 0%, and if the openness is 5% or more, it shifts from OFF to ON.

Figure 12:
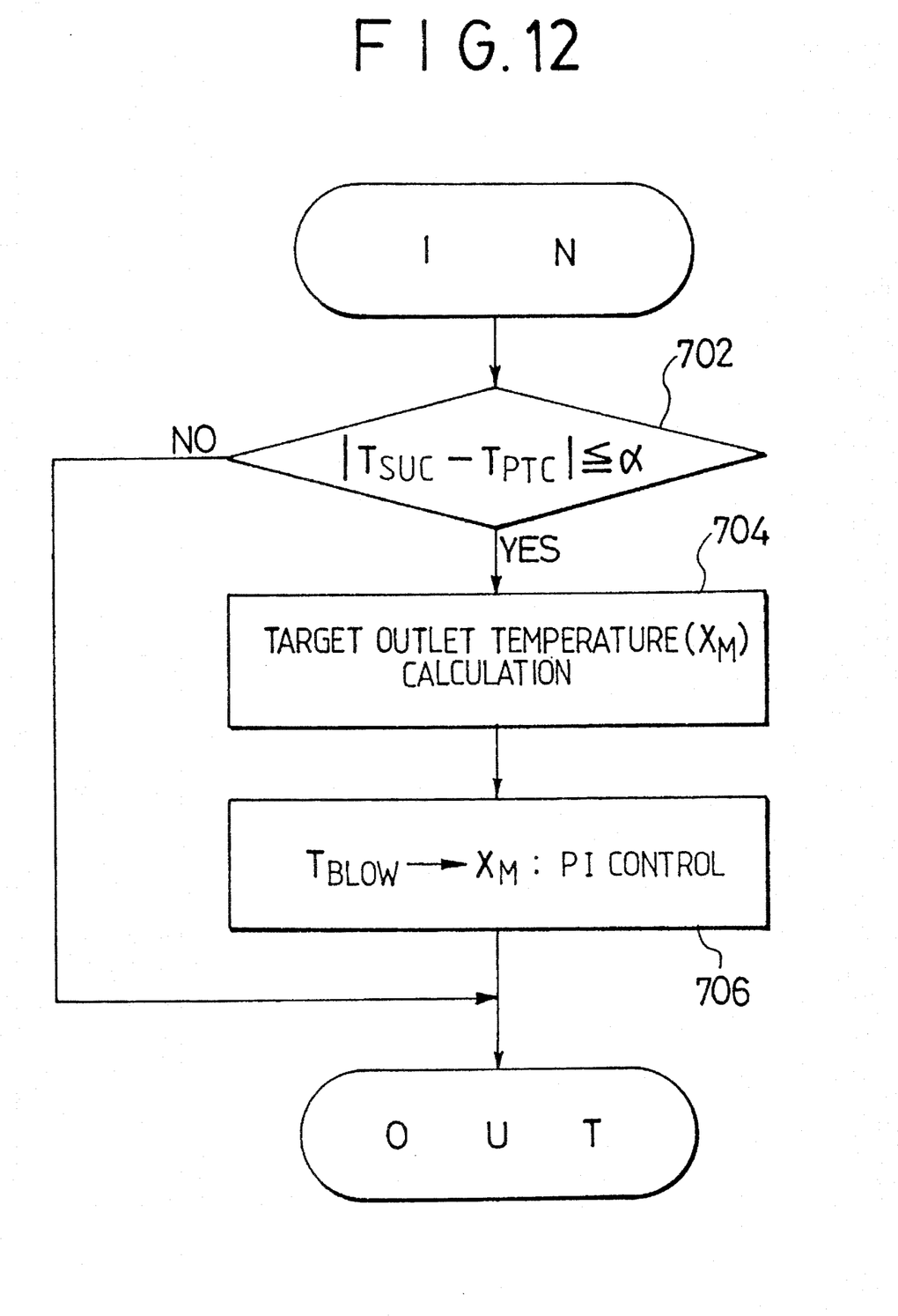
FIG. 12 is a flow chart showing an example of the control operation of the 3-way valve used in the multi-compartment temperature management apparatus for a vehicle.

The openness control for the 3-way valve 31a is also detailed in FIG. 12. In step 702, a decision is made as to whether or not $|\Delta T = T_{SUC} - T_{PTC}|$ is equal to or less than a specific value α (e.g. equal to or less than 3° C.) to determine whether or not the intake temperature has adjusted toward the temperature setting to a certain extent. If it is decided in step 702 that $|\Delta T| > 3°$ C., the operation proceeds to step 704, in which the target outlet temperature ($X_M$) of the air discharged into the freezer is calculated. This target outlet temperature ($X_M$) can be calculated in various ways, but it is desirable to calculate it based upon the expression 1 using the intake temperature ($T_{SUC}$) and the temperature setting ($T_{PTC}$), for example.

$$X_M = T_{PTC} - \Delta T - \Sigma \beta * \Delta T \qquad \text{(expression 1)}$$

Here, β is an operating constant that is pre-set through experiment.

After the target outlet temperature ($X_M$) is calculated, the operation proceeds to step 706 in which the openness of the 3-way valve 31a, which causes the outlet temperature ($T_{BROW}$) that is detected by the outlet temperature sensor 33a to be adjusted toward the target outlet temperature ($X_M$), is calculated through proportional-plus-integral control (PI control). Note that the explanation of the PI control is omitted as the technique is of the known art.

To summarize what has been explained so far, the temperature adjustment control (intake control) whereby the difference between the intake temperature and the temperature setting is reduced, is performed until the intake temperature comes within a specific temperature setting range (within ±3° C. of the temperature setting). In other words, since it is necessary to promptly cool the inside of the freezer toward the temperature setting when the intake temperature is very much higher than the temperature setting, the compressor 15, the condenser fan 22 and the unit fans 8a are tuned ON, the solenoid valve 18a is opened to promote cooling of the air by the evaporator 9a and the water pump 26 is turned OFF. At the same time, the entirety of the cooling water is induced into the bypass passage 29a so that the heater core 10a within the cooling unit 4a will not be heated. In contrast, if the intake temperature is much lower than the temperature setting, it is necessary to promptly heat the inside of the freezer toward the temperature setting, so the circulation of the coolant in the cooling circuit for the front storage compartment is stopped by closing the solenoid valve 18a, thereby stopping cooling of the air by the evaporator 9a. Then, the openness of the 3-way valve is adjusted in such a manner that the entirety of the engine cooling water is induced to the heater core 10a, and the water pump 26 is turned ON to heat the air that is led into the cooling unit 4a.

When the intake temperature has come within a certain temperature setting range, a stable control (outlet control) in which the outlet temperature, too, is made to be adjusted toward the target temperature. In other words, the outlet temperature is used as feedback and the openness of the 3-way valve 32, is PI controlled so that the difference between the outlet temperature and the target temperature will approach 0.

With this, the intake temperature changes in the direction of the temperature setting and the outlet temperature changes in the direction of the target temperature, resulting in a reduction in disparity of temperature distribution within the compartment regardless of the weather.

Figure 13:
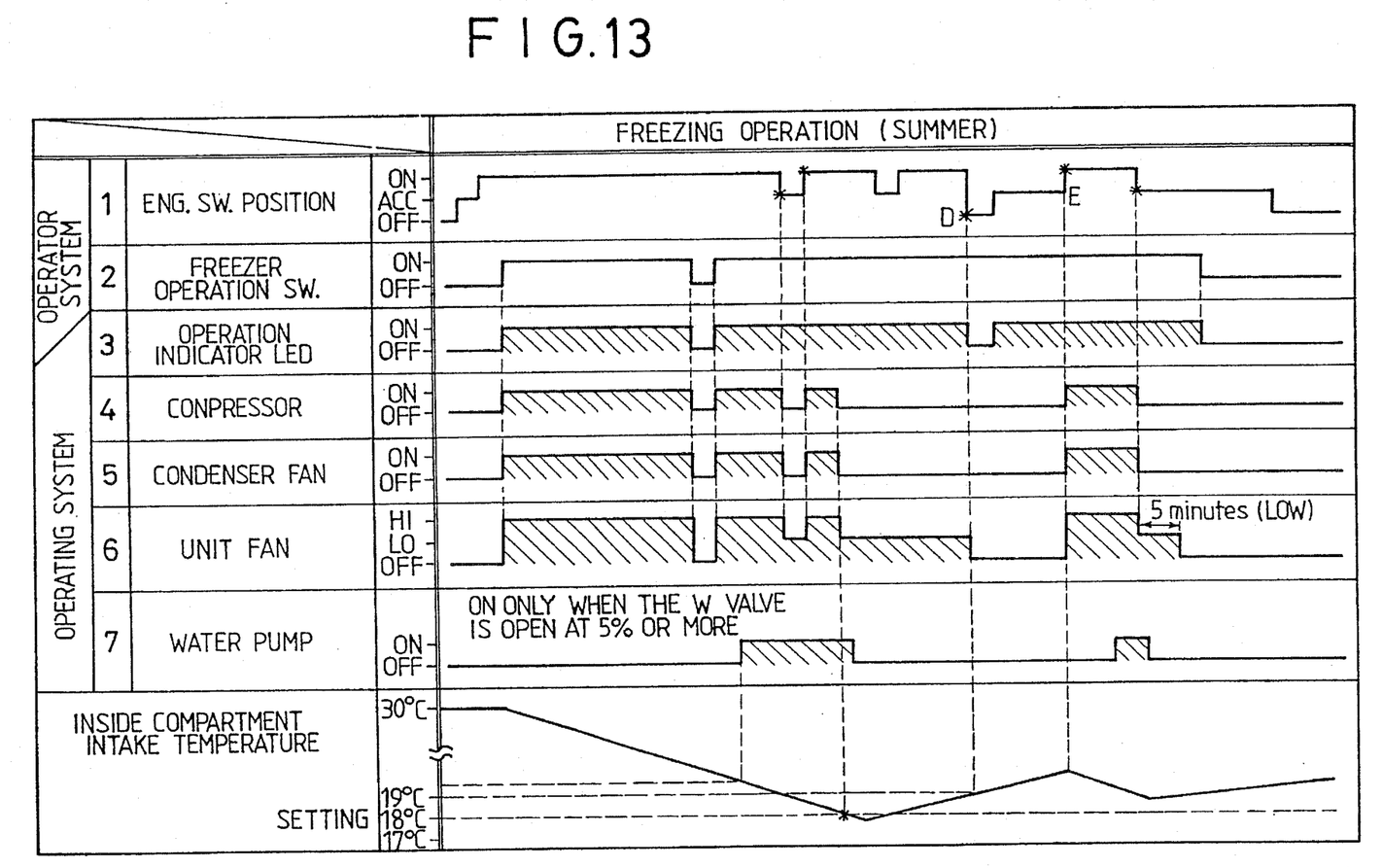
FIG. 13 is a time chart showing an example in which freezing operation is performed for one storage compartment.

Now, consider a case in the summer season when the temperature in the storage compartment is 30° C. with the engine switch 50 turned OFF, and the freezing operation must be executed with the temperature Setting at 18° C. As shown in FIG. 13, when the engine switch 50 is turned ON, and the operation switch 41 of the cooling unit is also turned ON so that the operation indicator LED 42 on the operating panel 40a becomes lit (ON), it causes the compressor 15 to start (ON), the condenser fan to rotate (ON), and the unit fans 8a to rotate at high speed (HI). During the initial stage of such a freezing operation, it is not necessary to supply heating medium to the heater core 10a because rapid cooling is required, and the water pump 26 remains in the OFF state.

As the inside of the compartment is rapidly cooled and the temperature in the compartment falls to within the range of the temperature setting (18° C.) 3° C., the operation shifts from intake control to outlet control. Now, when the openness of the 3-way valve 32 is at 5% or more, the water pump 26 is started up (ON). The operating states of the compressor 15 and the fans are determined by the difference between the intake temperature and the set temperature, as shown in FIG. 11. When the intake temperature comes down to the set value (18° C.), the compressor 15 stops, the condenser fan 22 is turned OFF and the unit fans 8a are set to LOW, as is clear from point C in FIG. 13. Even at this point, if the openness of the 3-way valve 32 is 5% or more, the water pump 26 remains in the ON state. When the cooling capacity becomes reduced as the air supply capacity of the compressor 15 and the fans is reduced, the intake temperature becomes gradually higher. When the intake temperature becomes higher than the temperature setting by 1.0° C. or more, the compressor 15 is turned ON and the condenser fan 22 is also turned ON. If the intake temperature becomes higher than the temperature setting by at least 1.5° C. the unit fans 8a are set to HIGH.

In FIG. 13, since the engine switch is turned OFF at the time point (point D) when the difference between the intake temperature and the temperature setting is 1° C. or less, the unit fans 8a are also turned OFF and, as the engine switch is turned ON again at point E when the difference between the intake temperature and the temperature setting exceeds 1.0° C. the compressor 15 and condenser fan 22 are also turned ON at that point, and the unit fans 8a, start to rotate at HI as well. Also, if the engine switch is left in a state in which has been switched from the ON mode to the ACC mode, the compressor 15 and the condenser fan 22 are turned OFF but the unit fans 8a keep rotating at LOW for 5 minutes after the ACC mode is entered.

Figure 4:
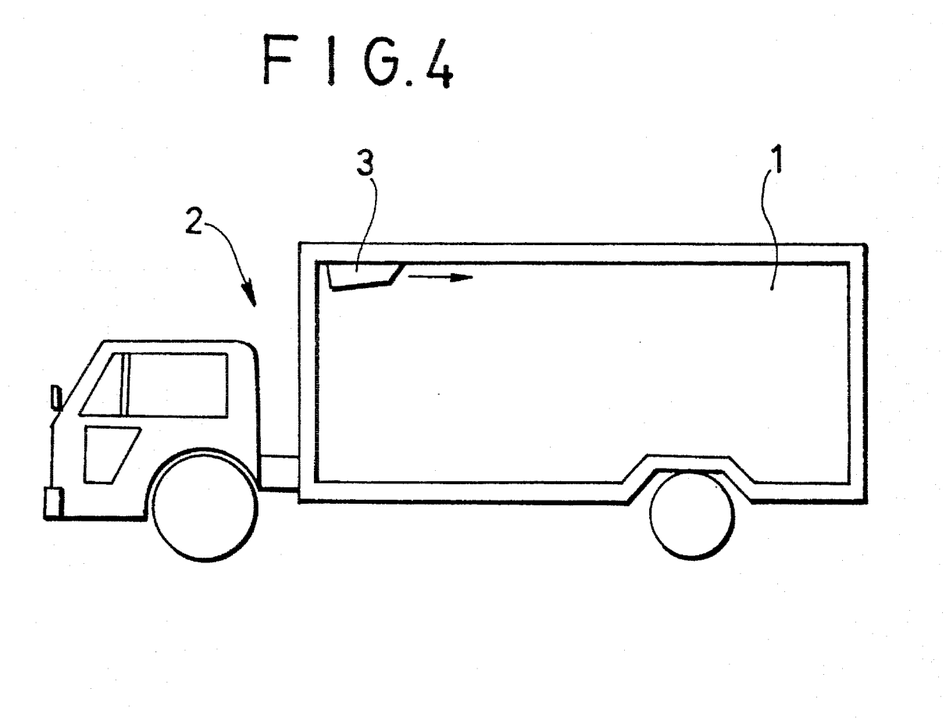
FIG. 4 is a schematic diagram showing a cooling unit mounted in a vehicle with one storage compartment.

In contrast to this, FIG. 4 shows an example in which the temperature inside the compartment is 0° C., as in winter, when the engine key is turned OFF and a warming operation must be executed because the temperature setting is at 18° C.

Figure 14:
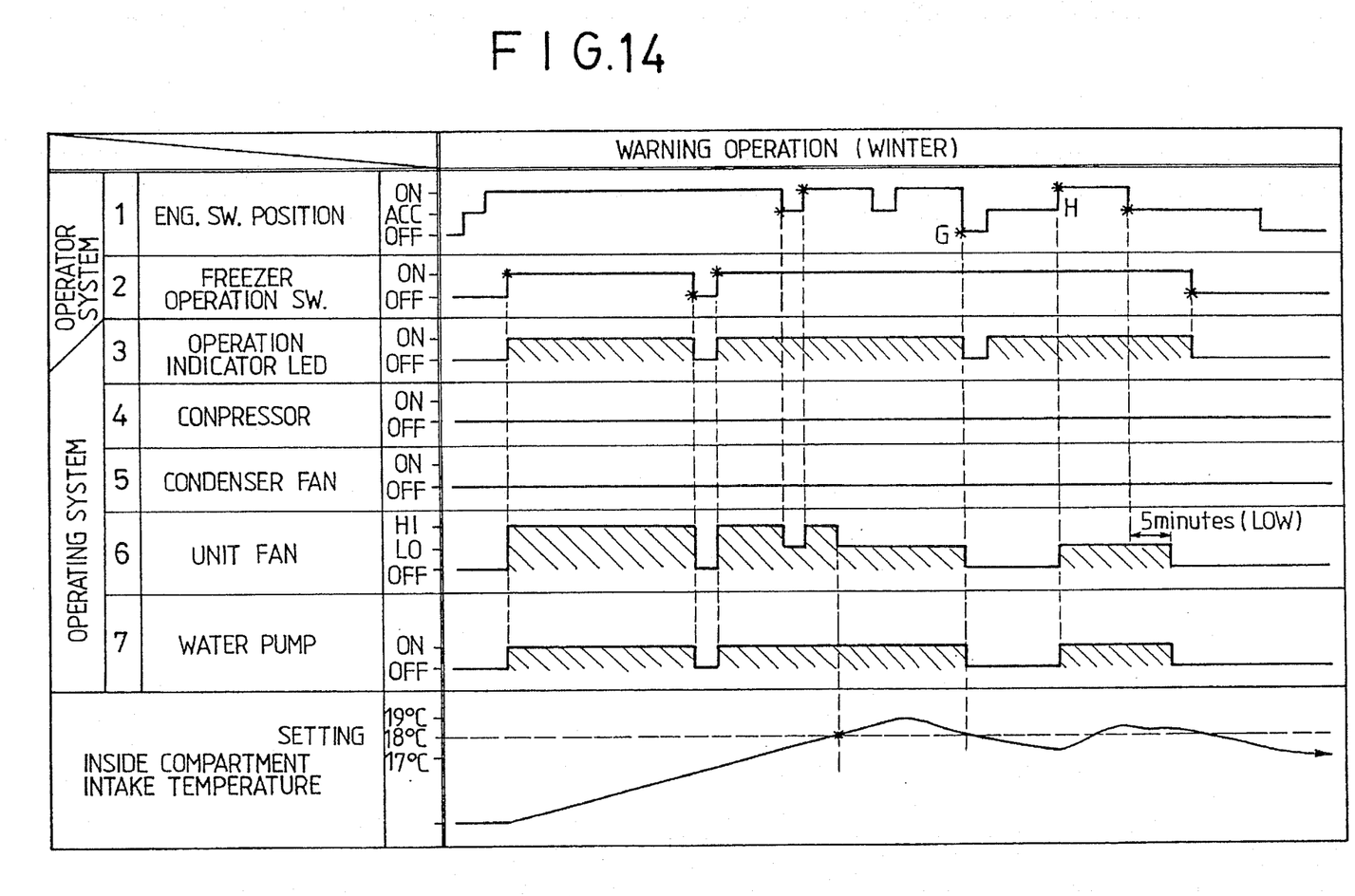
FIG. 14 is a time chart showing an example in which warming operation is performed for one storage compartment.

When the engine key is turned ON, and the operation switch 41 of the cooling unit is also turned ON, the operation indicator LED 42 on the operating panel 40a becomes lit (ON), the compressor 15 starts (ON), the condenser fan starts to rotate (ON), and the unit fans 8a rotate at high speed (HI). During the initial stage of such a warming operation, it is not necessary for the compressor 15 and the condenser fan 22 to operate because rapid heating operation is required and they are both turned OFF. In this state, the water pump 26 is ON, the unit fans 8a rotate at HI to supply the air which has been heated in the heater core 10a into the compartment.

When the inside of the compartment is rapidly heated and the temperature in the compartment enters the range of the set value (18° C.) ±3° C., the operation shifts from intake control to outlet control, in which the compressor 45 and the condenser fan 22 are still in the OFF state, but the operation of the water pump 26 and the openness of the 3-way valve are determined by the difference between the intake temperature and the set value, as shown in FIG. 11. Thus, when the intake temperature rises to the set value (18° C.), the unit fans 8a are set at LOW as shown at point F in FIG. 13, and the compressor 15 and condenser fan 22 are not turned ON as long as the intake temperature does not exceed the set value by 1° C. or more. As the heating capacity is reduced with the unit fans 8a set at LOW, the intake temperature becomes gradually lower and when it becomes lower than the set temperature by 1.5° C. or more, the unit fans 8a are set to HI.

In FIG. 14, since the engine key is turned OFF at the time point (point G) when the difference between the intake temperature and the temperature setting is less than 1° C., the unit fans 8a are turned OFF and, as the engine switch is turned ON again at the time point (point H) when the difference between the intake temperature and the temperature setting is equal to or more than −1.5° C., the unit fans 8a, start to rotate at HI again. Also, if the engine switch 50 is left in the state in which is it has been switched from the ON mode to the ACC mode, the unit fans 8a keep rotating at LOW for 5 minutes after the ACC mode is entered.

Such control is performed in a similar manner in the cooling unit 4b on the rear storage compartment side.

According to the present invention, since the compressor and the like in the cooling circuit are used commonly by the front storage compartment side and the rear storage compartment side, if there is a request for cooling either of the compartments, the compressor 15 in the cooling circuit is started up. Also, if there is a request to cool one of the compartments, the other compartment can be heated through the operation of the solenoid valves 18a, 18b and the 3-way valves 31a, 31b. This means that by adjusting the temperature setting for each storage compartment individually, a desired temperature control state can be created automatically for each compartment.

As has been described above, since it is possible to implement temperature control for each storage compartment independently by varying the quantity of coolant supplied to the evaporator and also by varying the quantity of heating medium supplied to the heater core for each storage compartment through the operation of the solenoid valves and the 3-way valves, cargos of varying types in small quantities can be transported efficiently by grouping them according to type and housing them in separate storage compartments.

Also, since the outlet temperature changes in the direction of the target outlet temperature by varying the openness of the valve after the intake temperature has come within a specific temperature setting range while the intake temperature is caused to be adjusted toward the temperature setting, disparities in temperature distribution in the space being temperature controlled can be automatically suppressed, and the temperature in the space being temperature controlled can be maintained constant regardless of the season.

What is claimed is:

1. A control apparatus for a cooling unit having a heating function, said apparatus comprising:

a cooling unit casing;

a plurality of unit fans located within said cooling unit casing;

a cooling circuit including an evaporator and a heater core each located within said cooling unit casing;

a valve for controlling a flow rate of a heating medium into said heater core;

an intake temperature sensor for detecting an air intake temperature of air taken into said cooling unit casing;

an outlet temperature sensor for detecting an air outlet temperature of air discharged from said cooling unit casing into a space to be temperature regulated;

a temperature setting device for setting a regulated temperature for the space to be temperature regulated;

a target outlet temperature calculation means for calculating a target air outlet temperature for the air that is discharged into said space to be temperature regulated based upon said air intake temperature detected by said intake temperature sensor and said regulated temperature set by said temperature setting device; and a valve openness control means for maintaining said valve in one of a fully open state and a fully closed state until said air intake temperature enters a predetermined temperature range, and for then adjusting a degree of openness of said valve to cause said air outlet temperature detected by said outlet temperature sensor to be adjusted toward said target air outlet temperature calculated by said target outlet temperature calculation means.

2. A control apparatus for a cooling unit according to claim 1, wherein said valve is a 3-way valve that adjusts the ratio of a quantity of said heating medium that flows into said heater core to a quantity of said heating medium that bypasses said heater core.

3. A control apparatus for a cooling unit according to claim 1, wherein the space to be temperature regulated is a storage compartment, and wherein said cooling unit casing is secured on a ceiling toward a front end of the storage compartment.

4. A control apparatus for a cooling unit according to claim 1, wherein the space to be temperature regulated is a storage compartment, and wherein said plurality of unit fans are located on an extreme upstream side of said cooling unit casing so as to draw in air from a storage compartment, wherein said evaporator and said heater core are located downstream of said plurality of unit fans, and wherein the air drawn in from said storage compartment by said plurality of unit fans passes through said evaporator and said heater core and is then delivered back to said storage compartment.

5. A control apparatus for a cooling unit according to claim 4, wherein said intake temperature sensor is located at an air intake port of said plurality of unit fans, and wherein said outlet temperature sensor is located in a vicinity of an outlet vent of said cooling unit casing.

6. A control apparatus for a cooling unit according to claim 1, wherein said heater core is located on a downstream side of said evaporator, and wherein an entirety of air that has passed through said evaporator passes through said heater core.

7. A control apparatus for a cooling unit according to claim 1, wherein said predetermined temperature range is a range defined by said regulated temperature ±3° C.

8. A control apparatus for a cooling unit according to claim 1, wherein said target outlet temperature calculation means calculates a function of a difference between said air intake temperature and said regulated temperature.

9. A control apparatus for a cooling unit according to claim 1, wherein said valve openness control means effects proportional-plus-integral control to control said degree of openness of said valve.

* * * * *